(12) United States Patent
Piotrowski et al.

(10) Patent No.: US 12,039,754 B2
(45) Date of Patent: Jul. 16, 2024

(54) OPTICAL POSITION DETERMINATION AND IDENTIFICATION SYSTEM

(71) Applicant: Lufthansa Technik AG, Hamburg (DE)

(72) Inventors: Pawel Piotrowski, Berlin (DE); Tsen Miin Tran, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 469 days.

(21) Appl. No.: 17/299,837

(22) PCT Filed: Dec. 4, 2019

(86) PCT No.: PCT/EP2019/083653
§ 371 (c)(1),
(2) Date: Jun. 4, 2021

(87) PCT Pub. No.: WO2020/115121
PCT Pub. Date: Jun. 11, 2020

(65) Prior Publication Data
US 2022/0027619 A1 Jan. 27, 2022

(30) Foreign Application Priority Data
Dec. 5, 2018 (DE) ...................... 10 2018 131 000.5

(51) Int. Cl.
*G06T 7/73* (2017.01)
*G06V 10/24* (2022.01)
(Continued)

(52) U.S. Cl.
CPC .............. *G06T 7/74* (2017.01); *G06V 10/245* (2022.01); *G06V 20/10* (2022.01); *G06V 20/59* (2022.01); *G06V 20/80* (2022.01)

(58) Field of Classification Search
None
See application file for complete search history.

(56) References Cited

U.S. PATENT DOCUMENTS 5,442,147 A 8/1995 Burns et al.
9,881,349 B1 1/2018 Meier et al.
(Continued)

FOREIGN PATENT DOCUMENTS

DE 602004001276 T2 4/2007
DE 202016006038 A1 12/2016
WO WO 2018129051 A1 7/2018

OTHER PUBLICATIONS

Laurent George, et al., "Humanoid Robot Indoor Navigation Based on 2D Bar Codes: Application to the NAO Robot," 2013 13th IEEE-RAS International Conference on Humanoid Robots (Humanoids), Oct. 15-17, 2013, pp. 329-335, IEEE, Atlanta, Georgia, USA.
(Continued)

*Primary Examiner* — Delomia L Gilliard
(74) *Attorney, Agent, or Firm* — LEYDIG, VOIT & MAYER, LTD.

(57) ABSTRACT

An optical position determination and identification system is for environments having a multiplicity of identically constructed objects. The system includes: a mobile image acquisition unit; and texture elements that are configured to be applied onto the objects. Each of the texture elements has a pattern that respectively comprises pseudorandom deviations from a predetermined basic pattern, which are not visible with the naked eye at a distance of 1 m. The image acquisition unit is configured to identify the texture elements uniquely with the aid of their pseudorandom deviations.

13 Claims, 2 Drawing Sheets

(51) Int. Cl.
      G06V 20/10    (2022.01)
      G06V 20/59    (2022.01)
      G06V 20/80    (2022.01)

(56) References Cited

U.S. PATENT DOCUMENTS

| | | | |
|---|---|---|---|
| 2005/0162396 A1* | 7/2005 | Meckesheimer | G09F 21/08 345/169 |
| 2007/0266782 A1 | 11/2007 | Bartz et al. | |
| 2010/0012780 A1* | 1/2010 | Kohlmeier-Beckmann | B64D 11/00 244/118.5 |
| 2012/0053779 A1* | 3/2012 | Fischer | H04W 4/023 701/29.6 |
| 2014/0022281 A1* | 1/2014 | Georgeson | G06F 3/1454 345/633 |
| 2017/0283086 A1* | 10/2017 | Garing | B64D 45/0051 |

OTHER PUBLICATIONS

Jingwen Dai et al., "Touchscreen Everywhere: On Transferring a Normal Planar Surface to a Touch-Sensitive Display," IEEE Transactions on Cybernetics, Aug. 2014, pp. 1383-1396, vol. 44, Issue 8, IEEE, New York City, NY, USA.

* cited by examiner

OPTICAL POSITION DETERMINATION AND IDENTIFICATION SYSTEM

CROSS REFERENCE TO RELATED APPLICATIONS

This application is a U.S. National Phase application under 35 U.S.C. § 371 of International Application No. PCT/EP2019/083653, filed on Dec. 4, 2019, and claims benefit to German Patent Application No. DE 10 2018 131 000.5, filed on Dec. 5, 2018. The International Application was published in German on Jun. 11, 2020 as WO 2020/115121 A1 under PCT Article 21(2).

FIELD

The invention relates to an optical position determination and identification system, in particular for use on-board commercial aircraft.

BACKGROUND

For various applications, it is desirable to be able to determine the relative position on-board an aircraft and/or uniquely identify objects, for example aircraft seats, located in the vicinity of this position. In order to detect damage on precisely these objects, for example, it is necessary to identify the objects uniquely. For other damage in the aircraft cabin (for example on the floor) maximally accurate detection of the location of the damage is necessary in order to be able to plan repair measures as accurately as possible in advance, so that the time required for the actual repair can be kept as short as possible.

Also envisageable are augmented reality applications (AR applications) for passengers on-board, in which images displayed on a mobile terminal are supplemented with additional computer-generated information or virtual objects. So that this additional information can be visually inserted correctly, accurate position and orientation determination of the mobile terminal is necessary.

For the unique identification of objects, it is known to provide them with a computer-readable label comprising a unique identification code. In order to keep the requirements of readers for reading the identification code low, barcodes and/or QR codes, which can be read optically, are also often employed. In order not to interfere with the visual appearance of the aircraft cabin, however, the computer-readable labels are regularly arranged at somewhat concealed locations on the objects, which may make reading them difficult.

Optical position determination extending beyond this on-board an aircraft is currently not possible, or at least not reliably possible. Although objects inside the aircraft cabin, for example a passenger seat, can in principle be detected by means of so-called edge-based model tracking, in which object edges in a camera image are determined and compared with computer models of the relevant objects, and the relative position of the camera in relation to the acquired object can also be determined, actual position determination inside the cabin, or unique allocation of relevant objects, is not however reliably possible because of the multiplicity of objects with the same shape—for example passenger seats—inside an aircraft cabin.

SUMMARY

In an embodiment, the present disclosure provides an optical position determination and identification system that is for environments having a multiplicity of identically constructed objects. The system includes: a mobile image acquisition unit; and texture elements that are configured to be applied onto the objects. Each of the texture elements has a pattern that respectively comprises pseudorandom deviations from a predetermined basic pattern, which are not visible with the naked eye at a distance of 1 m. The image acquisition unit is configured to identify the texture elements uniquely with the aid of their pseudorandom deviations.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
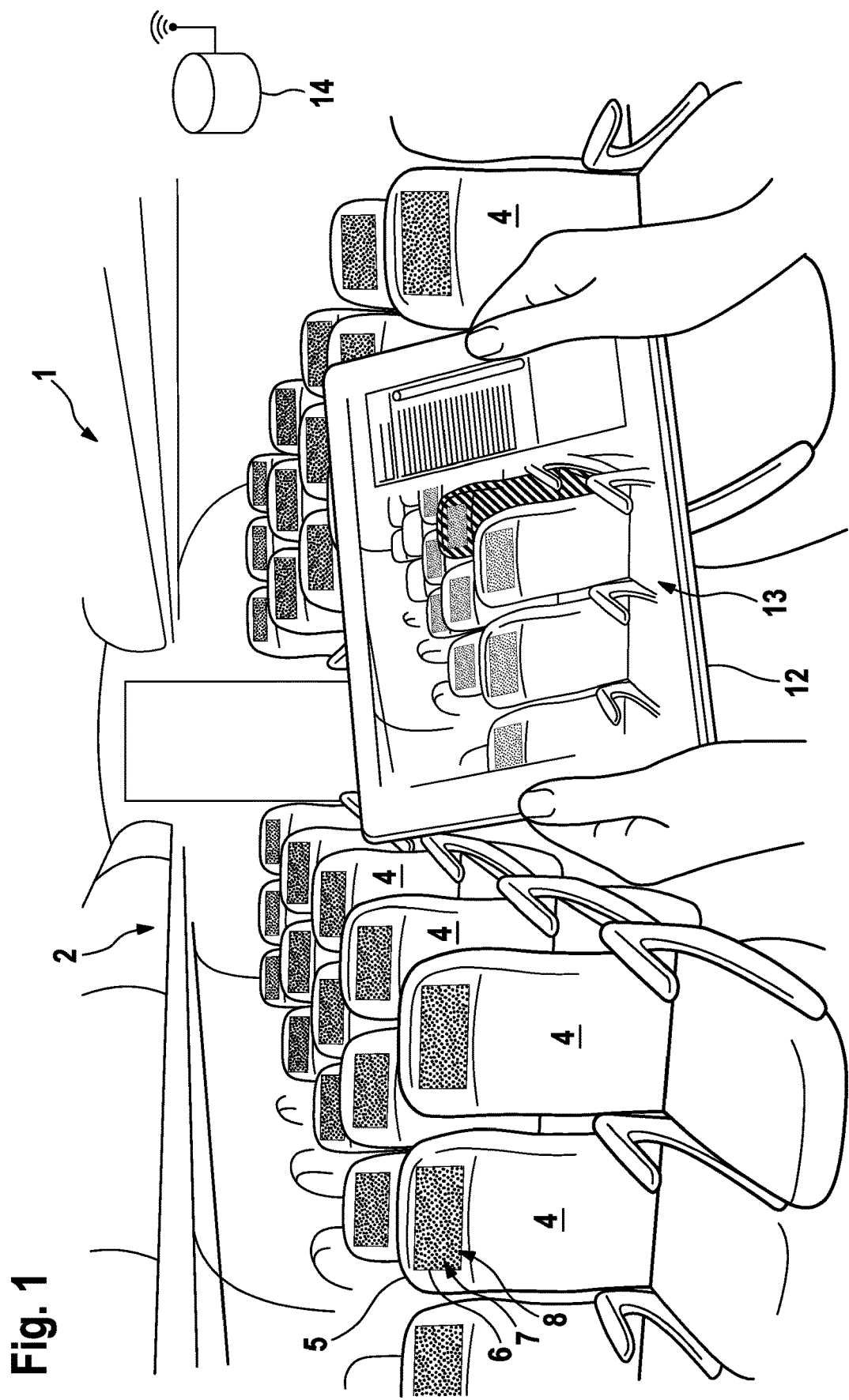
FIG. 1: shows an exemplary embodiment of an arrangement according to the invention.

Embodiments of the present invention provide an improved optical position determination and identification system.

An embodiment of the present invention relates to an optical position determination and identification system in environments having a multiplicity of identically constructed objects, comprising a mobile image acquisition unit and texture elements that can be applied onto the objects. Each texture element has a pattern that respectively comprises pseudorandom deviations from a predetermined basic pattern, which are not visible with the naked eye at a distance of 1 m. The image acquisition unit is configured to identify the texture elements uniquely with the aid of their pseudorandom deviations.

The present inventors have discovered that, for position determination and identification in environments having a multiplicity of objects with the same shape, unique identification of the individual objects that is easy to carry out is advantageous and, in particular, essential for optical position determination with the aid of the optically detected objects. In order in this case to avoid the objects having to be provided (possibly multiply) with known optically readable labels such as barcodes or QR codes in readily visible regions that are necessary for problem-free identification, which is regularly detrimental for the design and ambience in the aircraft cabin, according to the invention texture elements are provided for identification purposes.

Each texture element has a pattern. The pattern may preferably be a multiply repeating pattern, so that the texture elements may be configured to be arbitrarily large. Consequently, they are particularly highly suitable as means of surface configuration for the objects and may regularly be incorporated well into the design of the aircraft cabin without their being perceived as distracting by passengers, as would be the case for example with directly visible QR codes. The same applies for the case in which the texture elements comprise individual image elements that do not repeat. The image elements may have almost any desired complexity and range from nonrepeating patterns to photographic image elements. Such texture elements—other than for example QR codes—are regularly not perceived as distracting by passengers.

In order, nevertheless, to allow identification, the patterns of the texture elements respectively have a uniquely identifiable pseudorandom deviation from a predetermined basic pattern, which are not visible with the naked eye at a distance of 1 m. "With the naked eye" means observations of the texture elements by the human eye, during which no optical aids are used. By arranging for nondetectability of the pseudorandom deviations of the patterns of the texture elements with the naked eye at a distance of 1 m between the texture elements and the observer, the texture elements appear fundamentally identical for any casual observers. The deviations of the patterns are, however, sufficient for the pseudorandom deviations to be recognizable by an optical image acquisition unit, for example cameras, which have a sufficiently high resolving power, in particular surpassing that of the human eye.

A corresponding pseudorandom deviation from a basic pattern is a systematic and uniquely identifiable modification of the basic pattern. The deviations from the basic pattern must in this case—as explained—be significant enough that they can be detected and established by the image acquisition unit. In particular, the deviations must thus, for example, also be determinable in the acquired images with the available resolution of the image acquisition unit, in which case a maximum distance between the texture element and the image acquisition unit, up to which the determination of the deviations from the basic pattern is intended to be possible, may of course be specified. In general, the deviations from the basic pattern may be made so small that they are not directly conspicuous in the case of conventional naked-eye observations of the pattern of a texture element by a passenger, even in comparison with neighboring texture elements, but can be recognized only—if at all—with closer observation by a person. The subjective resolving power of human vision may be reduced by a high complexity of the pattern, so that the deviations from the basic pattern may optionally be greater and therefore more easily identifiable for the image acquisition unit.

For example, the basic pattern may consist of a randomly acting arrangement of geometrical figures or graphics, for example company logos, in different colors and sizes. By systematic modification of the position or size of individual pattern components in the basic pattern, and therefore, the provision of pseudorandom deviations, it is possible to provide uniquely identifiable patterns for the texture elements, which can be detected by the image acquisition unit but almost cannot be identified with the naked eye. With a suitable resolution and/or color depth of the image acquisition unit, line thicknesses or hues may also be modified in order to provide deviations in relation to the basic pattern.

It is possible for all the patterns of the texture elements to be based on the same basic pattern. It is, however, also possible for some of them to be based on one basic pattern while others have another underlying basic pattern. In particular, texture elements provided for different types of objects may be based on different basic patterns. For example, texture elements for passenger seats may be configured differently than texture elements for wall panels.

The image acquisition unit according to the invention is configured to analyze the patterns of the texture elements on an image acquired by the image acquisition unit and to uniquely identify them with the aid of the pseudorandom deviations thereby established. To this end, the basic pattern on which the analyzed pattern of the texture element is based may be stored in the image acquisition unit so that the deviations can be determined by comparing the acquired pattern with the basic pattern. As an alternative, the image acquisition unit may be configured to derive a unique identification from the pattern itself. This is possible for example by determining characteristic average values from the acquired pattern, for example the average distance between the individual pattern components or the average size of the individual pattern components, and subsequently determining the deviations from these average values, from which the unique identification is then obtained.

In particular when the maximum distance between a texture element and the image acquisition unit, up to which unique identification of the pattern of the texture element is possible, is selected to be small, a sufficient position determination is possibly already ensured by actual identification of the pattern of a texture element by the image acquisition unit. This is because it is already possible to derive from the described identification already that the image acquisition unit must be located in the (immediate) vicinity of the texture element and therefore the object provided with it.

Preferably, a database connected to the image acquisition unit, containing the allocation of the texture elements to individual objects onto which the texture elements are applied, is provided, the image acquisition unit preferably being configured to determine the relative position of the image acquisition unit in relation to the identified objects by edge-based model tracking of the objects identified uniquely by means of the texture elements and the database. By a corresponding determination of the object that is provided with the identified texture element, the precise relative position of the image acquisition unit in relation to the object may be determined by edge-based model tracking with the aid of a computer model corresponding to the object. This is advantageous in particular for augmented reality applications.

If position data of the individual objects are furthermore stored in the database, the image acquisition unit may be configured to determine the absolute position of the image acquisition unit in the coordinate system of the position data stored in the database. By the above-described determination of the relative position of the image acquisition unit in relation to an identified object, with knowledge of the position of the object it is also possible to determine the absolute position of the image acquisition unit. In this case, the coordinate system in which the position data of the objects are stored in the database is will generally need to be employed.

The texture elements may be configured in almost any desired way. For instance, it is possible for at least some of the texture elements to be adhesive films, coatings and/or object covers, which in each case have a pattern, as described. It is also possible for at least some of the texture elements to be formed integrally with respectively one object, preferably by printing and/or stitching. In this case, the printed or stitched surface of the object is to be regarded as a texture element.

It is preferred for the above-described database to be centrally stored and for the image acquisition unit to have access to the database by means of a wireless connection. By the provision of a central database, simultaneous access of a plurality of image acquisition units to the database is possible. In order to avoid constant data exchange via the wireless connection, it is also possible for the image acquisition unit to maintain an image of the centrally stored database and to update the image only in the event of modifications in the database. As an alternative, it is also possible—if the image acquisition unit does not have sufficient computation capacity—for the image acquired by the image acquisition unit to be sent wirelessly to the central database. The identification of the texture elements and optionally further steps may then be carried out by the central database before the result is then transmitted back to the image acquisition unit.

It is preferred for the basic pattern to have a chaotic nature. "Chaotic nature" means that no regularity or at least no apparently functional regularity in the arrangement of the individual pattern components can be identified when observing the basic pattern. In the case of a corresponding pattern, pseudorandom deviations stand out even more clearly.

The system according to the invention is suitable, in particular, for position determination and/or object identification on-board aircraft.

The invention consequently also relates to an arrangement consisting of a commercial aircraft having a multiplicity of objects arranged in the passenger cabin and an optical position determination and identification system according to the invention as claimed in one of the preceding claims, wherein the objects is respectively provided with at least one texture element.

The objects may preferably be aircraft seats and/or wall panels.

If the position determination and identification system comprises a database, the latter is preferably stored on a server on-board the aircraft. This offers the advantage that the data of the database are, for example, available for a position determination even when the aircraft is in the air and there is not a sufficient data connection to a server located on the ground.

The system may also be used to monitor the state of the cabin of an aircraft by means of cameras. Instead of sensors that monitor individual components of the cabin in respect of whether for example a particular table is folded up, a corresponding component may for example have two different texture elements, only one or at least one of which cannot be seen respectively in one operating state. By virtue of the fact that only visible texture elements can be identified according to the invention, the status of the component in question may be deduced by means of the texture elements identified. It is, for example, possible that an autonomous drone, which preferably navigates independently with the aid of the position determinable according to the invention, correspondingly inspects the state of the components of the cabin of an aircraft.

FIG. 1 represents an arrangement 1 according to an embodiment of the invention. In this case, a multiplicity of passenger seats 4—also referred to as objects 4—are arranged in the passenger cabin 2. On each of the passenger seats 4, a head pad 6, which is provided with a multiply repeating pattern 7, is provided in the upper region of the backrest 5. The head pads 6 in this case represent texture elements 8 according to the invention, the patterns 7 of the individual texture elements 8 respectively representing pseudorandom deviations from a basic pattern 9.

Figure 2:
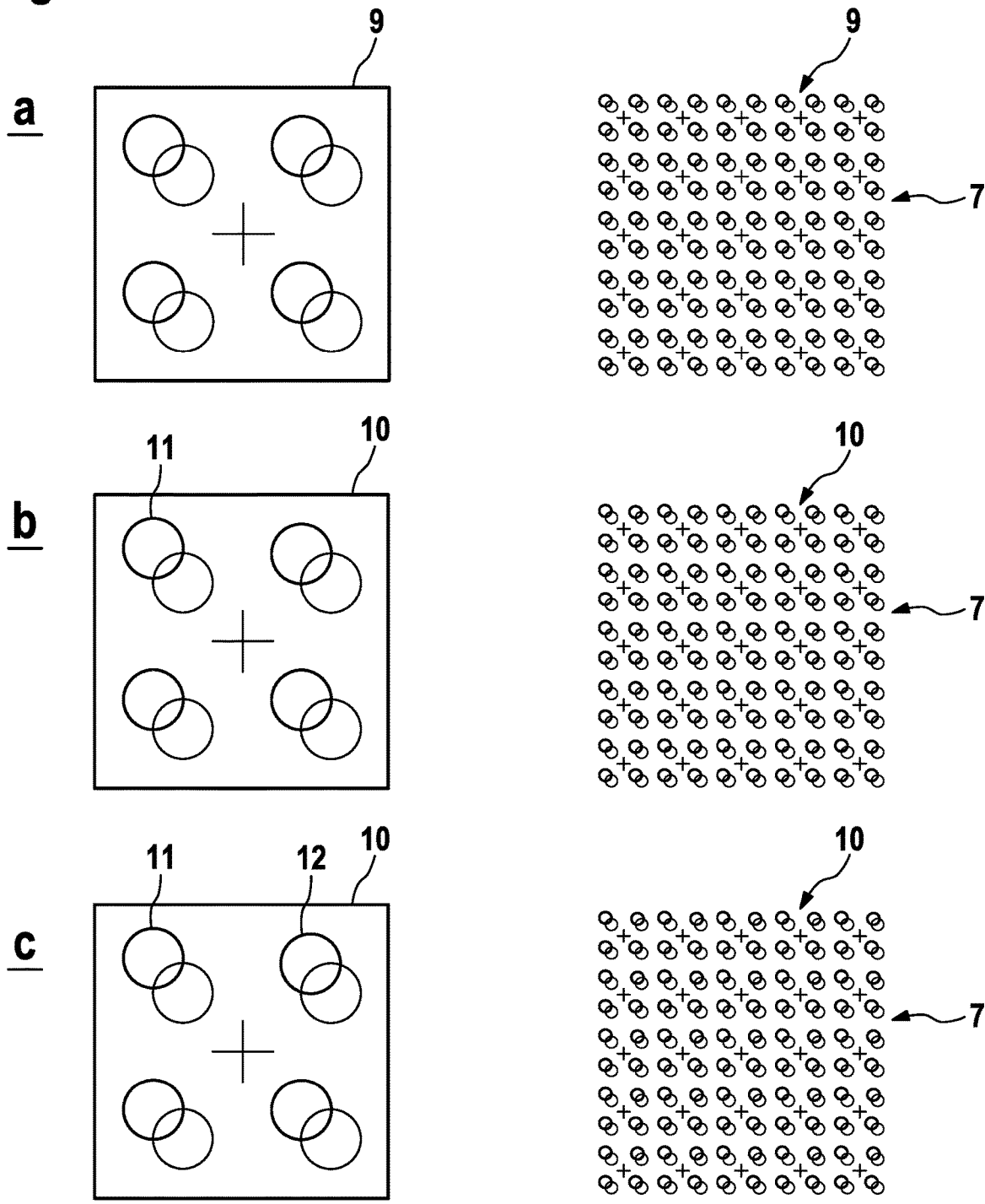
FIG. 2: shows examples of the multiply repeating patterns of the texture elements of FIG. 1.

This will be explained in more detail with the aid of FIG. 2, in which an exemplary basic pattern 9 (FIG. 2a) and two pseudorandom deviations therefrom (FIGS. 2b and 2c) are represented.

The basic pattern 9 is represented on an enlarged scale on the left-hand side of FIG. 2a, while on the right-hand side this basic pattern 9 is represented multiply repeated as a two-dimensional texture as is found in principle as a pattern 7 on the texture elements 8.

FIG. 2b represents a first pseudorandom deviation 10 from the basic pattern 9 according to FIG. 2a, again both in an enlarged form (left) and as a two-dimensional texture. In this example, one pattern component—the circle marked with the reference 11—is shifted slightly upward in relation to the basic pattern 9.

In the second pseudorandom deviation 10 according to FIG. 2c, besides the pattern component 11 shifted upward in a similar way to the first pseudorandom deviation 10, the pattern component provided with the reference 12—likewise a circle—is shifted slightly toward the right.

As may be seen in particular with the aid of the texture representations in FIGS. 2a-c, the deviations 10 in the individual patterns 7 are scarcely visible. Consequently, the difference in the patterns 7 of the individual texture elements 8 will regularly not be conspicuous to an observer who is on-board the commercial aircraft in the passenger cabin 2. The deviations in the individual patterns 7 are, however, sufficient that they can be detected by an image acquisition unit 12 (cf. FIG. 1) and used for the unique identification.

The image acquisition unit 12 represented in FIG. 1 is a so-called tablet PC, on one side of which a large-area touch-sensitive screen 13 is provided, while a digital camera module is arranged on the other side. The image acquired by the digital camera module is processed by the image acquisition unit 12 before it is represented on the screen 13 in a form supplemented with additional information.

The image acquisition unit 12 is configured, at least for those texture elements 8 that are sufficiently close to the digital camera module that the deviations contained there from the basic pattern 9 are actually imaged in the acquired image and with the resolution of the digital camera module, to uniquely identify the respective deviation and therefore the texture element 8 itself. To this end, it is possible to use known image processing methods, which can access on demand the basic pattern 9 stored in a database 14 located on a server located on-board the aircraft. The image acquisition unit 12 and the server with the database 14 are to this end connected to one another wirelessly.

An allocation of texture elements 8 to the respective objects 4, in this case the individual aircraft seats 4, is furthermore contained in the database 14, additional information relating to the position of the individual objects 4 inside the aircraft cabin 2 as well as computer models of the individual objects 4 also being stored in the database 14 in addition to the direct allocation.

By the direct allocation of the identified texture elements 8 to the individual objects 4, the latter may likewise be identified uniquely. With the aid of the computer model respectively linked with the identified object 4, by means of edge-based model tracking it is possible to determine the relative position of the image acquisition unit 12 in relation to the identified object 4. Since the position of the identified object 4 inside the aircraft cabin 2 is furthermore known, it is possible to determine the absolute position of the image acquisition unit 12 in the aircraft cabin 2.

On the basis of the position, uniquely determined in this way, of the image acquisition unit 12, the image acquired by the by the digital camera module is supplemented with additional information before display on the screen 13. In the exemplary embodiment represented, one of the passenger seats 4 is in this case colored-in and information relating to damage of this particular seat is additionally overlaid.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optical position determination and identification system for environments having a multiplicity of identically constructed objects, the system comprising:
    a mobile image acquisition unit; and
    texture elements that are configured to be applied onto the objects,
    wherein each of the texture elements has a pattern that respectively comprises pseudorandom deviations from a predetermined basic pattern, which are not visible with the naked eye at a distance of 1 m, and
    wherein the image acquisition unit is configured to identify the texture elements uniquely with the aid of their pseudorandom deviations.

2. The system as claimed in claim 1, the system comprising:
    a database connected to the image acquisition unit, containing information on an allocation of each of the texture elements respectively to individual objects onto which the texture elements are applied,
    wherein the image acquisition unit is configured to determine a relative position of the image acquisition unit in relation to the identified objects by edge-based model tracking of the objects identified uniquely by the texture elements and the database.

3. The system as claimed in claim 2, wherein the database contains position data of the individual objects, and the image acquisition unit is configured to determine an absolute position of the image acquisition unit in a coordinate system of the position data stored in the database.

4. The system as claimed in claim 2, wherein the database is centrally stored, and the image acquisition unit has access to the database by means of a wireless connection.

5. The system as claimed in claim 1, wherein each of the texture elements has a respective multiply repeating pattern based on the basic pattern, each pattern repetition of each of the texture elements having a same pseudorandom deviation from the basic pattern.

6. The system as claimed in claim 1, wherein at least some of the texture elements are adhesive films, coatings, or object covers.

7. The system as claimed in claim 1, wherein at least some of the texture elements are formed integrally with respectively one object, preferably by printing and/or stitching.

8. The system as claimed in claim 1, wherein the basic pattern has a chaotic nature.

9. An arrangement comprising of a commercial aircraft having a multiplicity of objects arranged in a passenger cabin and the optical position determination and identification system as claimed in claim 1, wherein the objects are each respectively provided with at least one texture element.

10. The arrangement as claimed in claim 9, wherein the objects are aircraft seats or wall panels.

11. The arrangement as claimed in claim 9, wherein a database of the position determination and identification system is stored on a server on-board the commercial aircraft.

12. The arrangement as claimed in claim 1, wherein the optical image acquisition unit comprises a computer and a camera.

13. A method for optical position determination and identification for environments having a multiplicity of identically constructed objects, each of the identically constructed objects having one of a plurality of texture elements, each of the texture elements having a pattern that respectively comprises pseudorandom deviations from a predetermined basic pattern, which are not visible with the naked eye at a distance of 1 meter, the method comprising:
    using an optical image acquisition unit comprising a camera, identifying the texture elements uniquely with the aid of their pseudorandom deviations.

* * * * *